W. Ormsby,
Hand-Screw Clamp.
N° 59,861.  Patented Nov. 20, 1866.
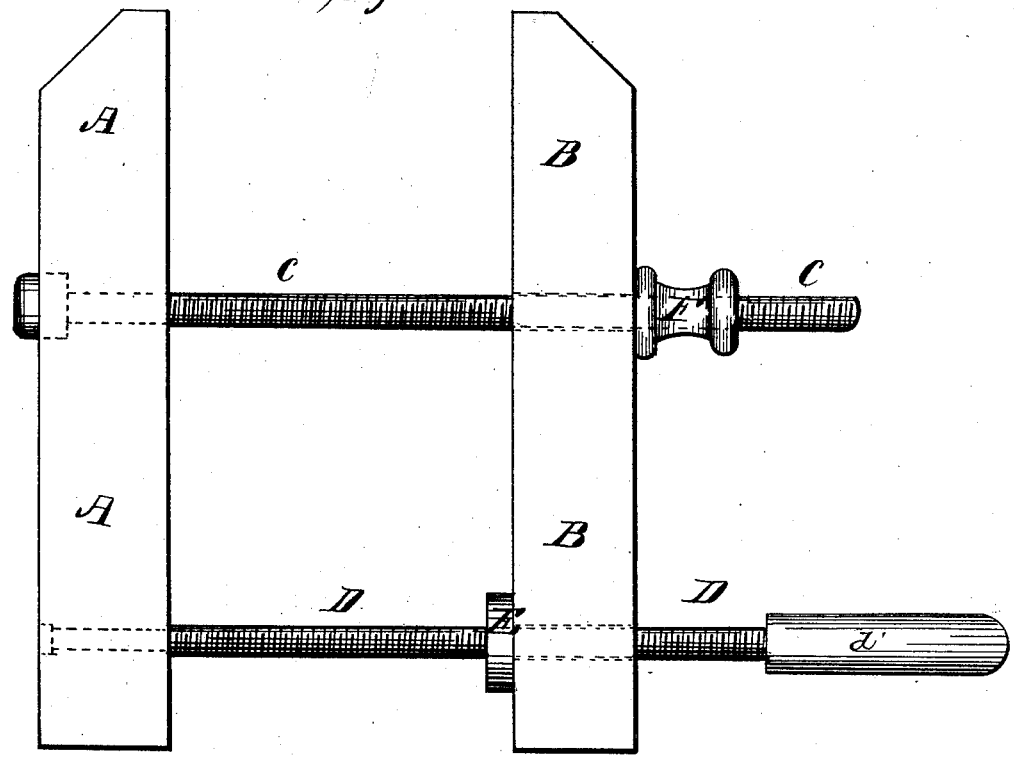
Fig: 1.

United States Patent Office.

IMPROVEMENT IN HAND-SCREW CLAMPS.

WILLIAM ORMSBY, OF BOSTON, MASSACHUSETTS.

Letters Patent No. 59,861, dated November 20, 1866.

SPECIFICATION.

TO ALL WHOM IT MAY CONCERN:

Be it known that I, WILLIAM ORMSBY, of Boston, Suffolk county, and State of Massachusetts, have invented a new and useful Improvement in Hand-Screw; and I do hereby declare that the following is a full, clear, and exact description thereof, which will enable others skilled in the art to make and use the same, reference being had to the accompanying drawing forming part of this specification, in which—

Figure 1 is a side view of my improved hand-screw.

My invention has for its object to furnish an improved hand-screw so constructed and arranged that the jaws may be set at any required distance apart easily and quickly; and it consists in the combination and arrangement of the jaws, screws, and nuts with each other, as hereinafter more fully described.

A and B are the jaws of the screw; the screw C is immovably attached to the jaw, A, and the screw D attached to the jaw, A, in such a way that it may be turned in said jaw but cannot be separated from it. The holes in the jaw, B, are of such a size that the said jaw, B, can move freely along said screws C and D. E is a nut working upon the screw D, and which is placed between the jaws A and B, as shown in the drawing. F is a nut working upon the screw C, and which is placed outside of the jaw B, as shown; d is a handle attached to or formed upon the end of the screw D, by means of which the said screw may be turned when desired. In using the screw, the nut F, by a quick motion of the hand, may be run out instantly the whole length of said screw, or so far as may be desired. The jaw B is then moved to the desired position and the nut E run up to it. The screw is then placed upon the object to be held and the nut F turned down closely against the jaw B, clamping the said object between the jaws A and B. The grasp of the jaws may then be still further tightened by turning the screw D by means of the handle d. This construction is adapted to hand-screws of any size, but it is more particularly adapted to the larger sizes, as the jaws may be quickly set at any required distance apart without lifting the instrument from the table.

I claim as new, and desire to secure by Letters Patent—

A hand-screw, formed of the jaws A and B, the screws C and D, and the nuts E and F, substantially as herein described, and for the purpose set forth.

WILLIAM ORMSBY.

Witnesses:
 JOHN W. GRANT,
 JOHN D. WHETTER.